US008031722B1

(12) United States Patent
Sanville et al.

(10) Patent No.: US 8,031,722 B1
(45) Date of Patent: Oct. 4, 2011

(54) TECHNIQUES FOR CONTROLLING A NETWORK SWITCH OF A DATA STORAGE SYSTEM

(75) Inventors: Alex Sanville, Chelmsford, MA (US); Douglas Sullivan, Hopkinton, MA (US); Stephen Strickland, Foxboro, MA (US)

(73) Assignee: EMC Corporation, Hopkinton, MA (US)

( * ) Notice: Subject to any disclaimer, the term of this patent is extended or adjusted under 35 U.S.C. 154(b) by 590 days.

(21) Appl. No.: 12/059,127

(22) Filed: Mar. 31, 2008

(51) Int. Cl.
*H04L 12/28* (2006.01)
*H04L 12/16* (2006.01)
(52) U.S. Cl. ..................... 370/395.7; 370/260
(58) Field of Classification Search ............... 370/395.7
See application file for complete search history.

(56) References Cited

U.S. PATENT DOCUMENTS

| | | | |
|---|---|---|---|
| 5,283,792 | A | 2/1994 | Davies, Jr. et al. |
| 5,774,640 | A | 6/1998 | Kurio |
| 6,633,905 | B1 | 10/2003 | Anderson et al. |
| 6,651,554 | B1 | 11/2003 | Williams |
| 6,678,639 | B2 | 1/2004 | Little et al. |
| 6,681,282 | B1 | 1/2004 | Golden et al. |
| 6,728,908 | B1 | 4/2004 | Fukuhara et al. |
| 6,873,268 | B2 | 3/2005 | Lebel et al. |
| 6,910,148 | B1 | 6/2005 | Ho et al. |
| 7,039,737 | B1 | 5/2006 | Dorr et al. |
| 2003/0055968 | A1 | 3/2003 | Hochmuth et al. |
| 2003/0078997 | A1* | 4/2003 | Franzel ........................ 709/220 |
| 2005/0044199 | A1 | 2/2005 | Shiga et al. |
| 2006/0007491 | A1 | 1/2006 | Kanda et al. |
| 2006/0112219 | A1* | 5/2006 | Chawla et al. ................ 711/114 |
| 2008/0229415 | A1* | 9/2008 | Kapoor et al. .................. 726/22 |

OTHER PUBLICATIONS

D'Antonio et al., "An Architecture for Automatic Configuration of Integrated Networks," Network Operations and Management Symposium, 2004, NOMS 2004, IEEE/IFIP, Seoul, Korea, Apr. 1-23, 2004, Piscataway, NJ, USA, 2004, IEEE, vol. 1, Apr. 19, 2004, (pp. 351-364).
Data Sheet: EMC CLARiiON CX Series, EMC Corporation, 2004, 8 pages.
Hangai, "Project MegaGrid: Building the Oracle Grid Reference Architecture," EMC Corporation,: (online) 2005, as retrieved from teh Internet: http://regions.cmg.org/regions/kccmg/Impact2005/ProjectMegaGridTechnical_20050930.ppt, Mar. 28, 2007, (pp. 1-49).
http://www.storagesearch.com/fchub.html, "The Shift to NAS Gateways," visited Aug. 17, 2006, 4 pages.
International Search Report from PCT/US2006/045155, mailed Apr. 13, 2007.
Written Opinion of PCT/US2006/045155, mailed Apr. 13, 2007.

* cited by examiner

*Primary Examiner* — Derrick W Ferris
*Assistant Examiner* — Angel Brockman
(74) *Attorney, Agent, or Firm* — BainwoodHuang (57) ABSTRACT

A technique controls a network switch having a set of ports. The technique involves configuring the network switch to provide an initial set of communications paths between the ports. The initial set of communications paths defines an initial communications path topology within the network switch. The technique further involves receiving a configuration command which identifies a particular operating mode of the data storage system after configuring the network switch to provide the initial set of communications paths within the network switch. The technique further involves reconfiguring the network switch to provide a new set of communications paths between the ports in response to the configuration command. The new set of communications paths (i) defines a new communications path topology within the network switch, the new communications path topology being different than the initial communications path topology, and (ii) supports the particular operating mode of the data storage system.

21 Claims, 7 Drawing Sheets

TECHNIQUES FOR CONTROLLING A NETWORK SWITCH OF A DATA STORAGE SYSTEM

BACKGROUND

A data storage system typically includes one or more storage processors and an array of disk drives. Each storage processor stores data into, and retrieves data from, the array of disk drives on behalf of one or more external hosts.

Some conventional data storage systems include network interfaces which enable the external hosts to remotely communicate with the data storage systems over networks. In the context of a conventional modularized data storage system (i.e., in which modularized components fit together within a common enclosure), the network interface is typically partitioned as a module which is separate from the storage processors and perhaps other devices.

Some conventional data storage systems include service processor interfaces which enable local service processors (e.g., local consoles or terminals, laptop computers, etc.) to communicate with the data storage systems. In the context of a conventional modularized data storage system, the service processor interface may also be partitioned as a module which is separate from the storage processors and other devices.

SUMMARY

It would be advantageous to provision data storage systems with modular interface devices equipped with multi-port network switches. Such a modular interface device would be well-suited for operating as both (i) a network interface for host communications and (ii) a service processor interface for service processor communications. That is, host communications could pass from a host through a first pair of ports of a network switch of the modular interface device to a storage processor of the data storage system. Similarly, service processor communications could pass from a local service processor to through a second pair of ports to the storage processor of the data storage system.

Along these lines, suppose that a data storage system is provisioned with two modular interface devices for redundancy and that each modular interface device has a multi-port network switch. Further suppose that each network switch has ports leading to the storage processors, other ports for external cable connectivity, and a crosslink port connecting to the other modular interface device. In such a data storage system, each modular interface device is able to operate as both a network interface and a service processor interface.

In one scenario (hereinafter call the "crosslink" scenario), the network switch of each modular interface device is configured to provide (i) a first communications pathway between a first pair of ports for host communications, (ii) a second communications pathway between a second pair of ports for service processor communications, and (iii) a crosslink pathway to the cross link port to enable communications between the two modular interface devices for more-flexible service processor communications. For enhanced network security, the first and second communications pathways are logically isolated from each other (e.g., using virtual local area networks or VLANs) thus preventing the service processor from intruding onto the host network.

A data storage system which is configured to operate in a manner similar to the above-described crosslink scenario is disclosed in U.S. application Ser. No. 11/394,943, entitled "METHOD AND APPARATUS FOR PROVIDING A LOGICAL SEPARATION OF A CUSTOMER DEVICE AND A SERVICE DEVICE CONNECTED TO A DATA STORAGE SYSTEM". The teachings of U.S. application Ser. No. 11/394,943 are hereby incorporated by reference in their entirety.

In another scenario (hereinafter called the "daisy-chain" scenario), the network switch of each modular interface device is configured to provide access to local storage processors (i.e., storage processors within the same enclosure as the modular interface device) as well as access non-local storage processors (i.e., storage processors in another enclosure). In particular, the network switch of each modular interface device provides (i) a first communications pathway to the local storage processors and (ii) a second communications pathway (i.e., a communications pathway which bridges two external cabling ports) to an adjacent enclosure which similarly contains local storage processors and modular interface devices. Such a scenario enables multiple enclosures to be daisy-chained together for enhanced data storage system scalability.

Unfortunately, drawbacks would exist if a network switch of an interface device where initially configured in accordance with the above-described crosslink scenario, but used in the daisy-chain scenario. In particular, the existence of the crosslink between the two interface devices in the daisy-chain scenario would create a return loop (e.g., an Ethernet loop) which could severely degrade network performance or even bring down network service completely (e.g., a source of packet storms).

Similarly, drawbacks would exist if a network switch of an interface device where initially configured in accordance with the above-described daisy-chain scenario, but used in the crosslink scenario. In particular, the existence of a communications pathway bridging two external cabling ports would result in an unacceptable loss of logical isolation between the two ports. Without such logical isolation, a local service processor connected to one cabling port could intrude onto the host network connected to the other cabling port.

Fortunately, an improved technique for managing communications involves configuring a network switch multiple times. In particular, the network switch is configured to provide an initial set of communications paths (e.g., an agnostic or benign topology which is not detrimental to the data storage system). Such an initial set of communications paths does not create an Ethernet loop or sacrifice logical isolation in the event that the data storage system is sensitive to either scenario. Subsequently, the network switch is reconfigured to provide a new set of communications paths (e.g., with a different topology) which improves operation of the data storage system, e.g., to provide a crosslink between network switches for enhanced service processor access if the data storage system does not enable daisy-chaining, to provide a daisy-chaining pathway for scalability if the data storage system does not require logical isolation, etc. Such a technique thus enables a common hardware design, which is capable of being reconfigured, to be used in both scenarios.

One embodiment is directed to a technique for controlling a network switch having a set of ports. The technique involves configuring the network switch to provide an initial set of communications paths between the ports. The initial set of communications paths defines an initial communications path topology within the network switch (e.g., a benign or agnostic configuration). The technique further involves receiving a configuration command which identifies a particular operating mode of the data storage system after configuring the network switch to provide the initial set of communications paths within the network switch. The technique further involves reconfiguring the network switch to provide a new set of communications paths between the ports in response to the configuration command. The new set of communications paths (i) defines a new communications path topology within the network switch, the new communications path topology being different than the initial communications path topology, and (ii) supports the particular operating mode of the data storage system.

In some arrangements, the network switch resides in a modular communications management device and is under direction of a controller or local processor. In these arrangements, the network switch is preferably a multi-port Ethernet switch. The controller, when configuring the network switch to provide the various sets of communications paths between the ports, is arranged to send controller signals to the multi-port Ethernet switch.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique for managing communications within a data storage system involves configuring a network switch multiple times. In particular, the network switch is configured to provide an initial set of communications paths (e.g., an agnostic or benign topology which is not detrimental to the data storage system). Such an initial set of communications paths does not create an Ethernet loop or sacrifice logical isolation in the event that the data storage system is sensitive to either scenario. Subsequently, the network switch is reconfigured to provide a new set of communications paths (e.g., with a different topology) which improves operation of the data storage system, e.g., to provide a crosslink between network switches for enhanced service processor access if the data storage system does not enable daisy-chaining, to provide a daisy-chaining pathway for scalability if the data storage system does not require logical isolation, etc. Such a technique thus enables a common hardware design, which is capable of being reconfigured, to be used in both scenarios.

Figure 1:
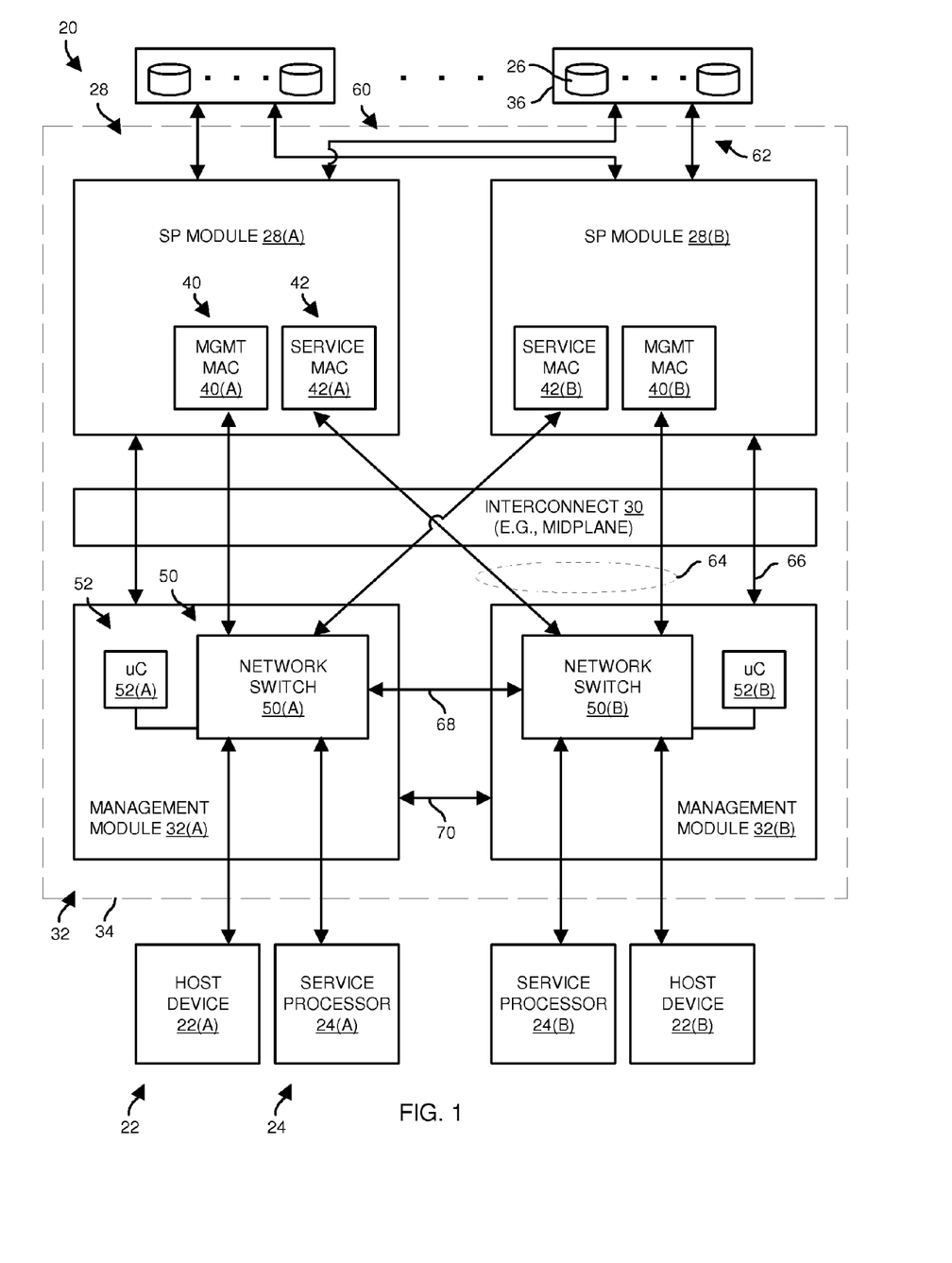
FIG. 1 is a block diagram of a data storage system which includes multiple modular communications management devices which interface with external devices (e.g., hosts, service processors, etc.).

FIG. 1 shows a data storage system 20 with enhanced communications management capabilities. As shown, the data storage system 20 is arranged to store and retrieve data on behalf of one or more external host devices 22(A), 22(B) (simply, hosts 22). Additionally, the data storage system 20 is arranged to provide access to one or more external service processors 24(A), 24(B) (e.g., a computerized workstation for a technician and administrator of the data storage system 20).

As further shown in FIG. 1, the data storage system 20 includes an array of storage devices 26 (e.g., one or more disk drive enclosures), a set of storage processor modules 28(A), 28(B) (collectively, SP modules 28), a data storage interconnect 30 (e.g., a midplane, a backplane, etc.), and a set of communications management devices 32(A), 32(B) (shown as management modules 32 in FIG. 1).

By way of example, the SP modules 28, the data storage interconnect 30 and the management modules 32 are shown in FIG. 1 as being supported by a common support frame or enclosure 34 (e.g., a rack mount enclosure). Similarly, the storage devices 26 (e.g., disk drives, flash memory modules, combinations thereof, etc.) may reside in one or more storage device enclosures 36.

Each SP module 28 is arranged to operate as data storage engine by efficiently and effectively processing data storage operations. As shown in FIG. 1, each SP module 28 includes, among other things, transceiver devices for communicating with other data storage system components. In particular, the SP module 28(A) includes a management MAC (medium access control) device 40(A) and a service MAC device 42(A). Similarly, the SP module 28(B) includes a management MAC device 40(B) and a service MAC device 42(B). The management MAC devices 40(A), 40(B) (collectively, management MAC devices 40) are arranged to handle communications in connection with host data storage operations. In contrast, the service MAC devices 42(A), 42(B) (collectively, service MAC devices 42) are arranged to handle communications in connection with data storage administration and servicing.

As further shown in FIG. 1, each management module 32 includes a multi-port network switch 50 and a microcontroller 52 for controlling operation of the multi-port network switch 50. For example, the management module 32(A) includes a multi-port network switch 50(A) and a microcontroller 52(A) which is capable of configuring the network switch 50(A). Similarly, the management module 32(B) includes a network switch 50(B) and a microcontroller 52(B) which is capable of configuring the network switch 50(B).

At this point, it should be understood that a variety of conductive pathways 60 exist between the components of the data storage system 20. Each conductive pathway 60 is formed via a combination of signal traces, connectors, and/or cables, etc. For example, multiple conductive pathways 62 (e.g., SATA, SCSI, etc.) exist between each device enclosure 36 and each SP module 28. Additionally, high speed conductive pathways 64 (e.g., 10/100 Ethernet) and ancillary connections 66 (e.g., I2C, UART) exist between the SP modules 28 and the management modules 32 through the interconnect 30. Furthermore, a high speed conductive pathway 68 (e.g., 10/100 Ethernet) and a secondary conductive pathway 70 (e.g., RS232) exist between the management modules 32. Although the conductive pathway 68, 70 are shown as directly extending between the management modules 32 for simplicity, it should be understood that the conductive pathway 68, 70 may pass through the interconnect 30 in some arrangements. Other conductive pathways may exist between the various components as well (e.g., one or more paths between the SP modules 28) and are omitted from FIG. 1 for simplicity. Further details will now be provided with reference to FIG. 2.

Figure 2:
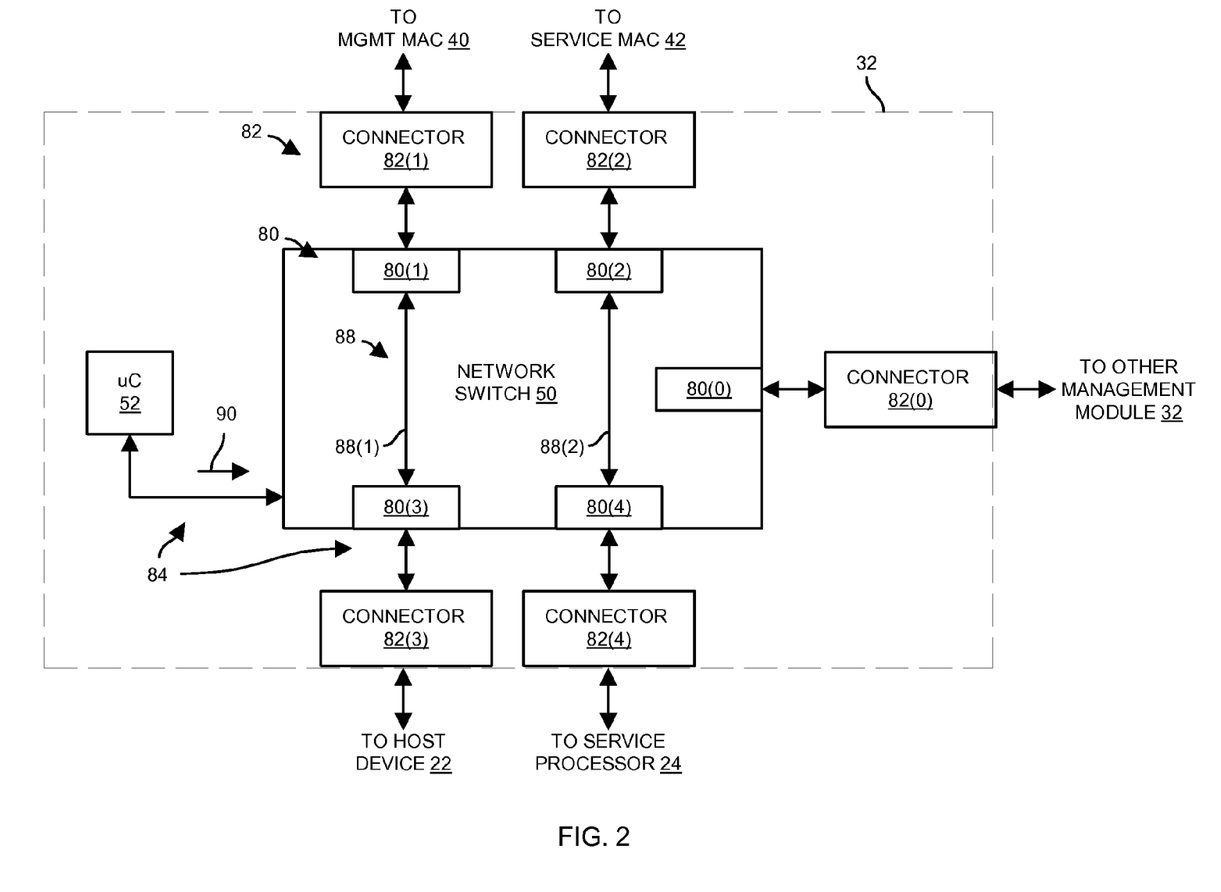
FIG. 2 is a block diagram of a modular communications management device of the data storage system of FIG. 1 when providing an initial set of communications paths which defines an initial communications path topology.

FIG. 2 shows particular details of a management module 32 (also see the management modules 32(A), 32(B) in FIG. 1). The management module 32 includes, among other things, a network switch 50 having multiple ports 80 (e.g., five ports), a microcontroller 52, multiple connectors 82, and conductive pathways 84 which electrically interconnect these components.

The network switch 50 is capable of establishing high speed bidirectional communications paths between the ports 80 in response to microcontroller signals from the microcontroller 52. An example of a multi-port Ethernet switching integrated circuit (IC) device that is suitable for use as the network switch 50 is the BCM5325E 10/100 Ethernet Switch provided by Broadcom Corporation of Irvine, Calif.

As shown in FIG. 2, port 80(0) of the network switch 50 electrically connects to a crosslink connector 80(0) which leads to the other management module 32 perhaps through the interconnect 30 (also see the conductive pathway 68 in FIG. 1). Port 80(1) electrically connects to a midplane (or backplane) connector 82(1) which leads to a management MAC device 40 of an SP module 28 through the interconnect 30 (a conductive pathway 64 in FIG. 1). Similarly, port 80(2) electrically connects to another midplane connector 82(2) which leads to a service MAC device 42 of an SP module 28 through the interconnect 30 (another conductive pathway 64 in FIG. 1). Port 80(3) electrically connects to an external connector 82(3) (e.g., an RJ-45 jack) which operates as an external host port of the data storage system 20. Furthermore, port 80(4) electrically connects to another external connector 82(4) (e.g., another RJ-45 jack) which operates as an external service port of the data storage system 20.

In some arrangements, the connectors 82(0), 82(1) and 82(2) are specialized interconnect connectors which enable the management module 32 to connect to the interconnect 30 in a blind mating manner. In contrast, the connectors 82(3) and 82(4) are external ports that enable a user to physically plug cables therein.

During operation, the microcontroller 52 controls configuration of communications paths 88 through the network switch 50 by outputting a configuration signal 90 to the network switch 50. For example, immediately after the management module 32 powers up, the microcontroller 52 outputs the configuration signal 90 to initially configure the network switch 50 to provide a general but safe set of communications paths 88 between certain ports 80. In particular, the microcontroller 52 may not have yet established communications with other parts of the data storage system 20 and thus may have no information regarding a particular configuration, mode or condition of the data storage system 20. Accordingly, the microcontroller 52 (e.g., based on firmware) directs the network switch 50 to provide, as the initial set of communications paths 88, an agnostic or benign configuration of communications paths 88 which enables some traffic through the network switch 50 but that is not detrimental to the data storage system 20.

FIG. 2 shows an initial set of communications paths 88 that permits certain traffic flow, but that does not pose potential problems to the data storage system 20. As shown, the configuration signal 90 directs the network switch 50 to establish a first communications path 88(1) between the ports 80(1), 80(3), and a second communications path 88(2) between the ports 80(2), 80(4). As a result, the management module 28 now provides an initial communications path topology which supports an operable management port (i.e., connector 82(3)) and an operable service port (i.e., connector 82(4)) for the data storage system 20.

However, it should be understood that this virtual local area network (VLAN) configuration is arranged to restrict traffic from certain ports 80 of the network switch 50. In particular, the microcontroller 52 purposefully arranges the communications paths 88(1), 88(2) to be logically isolated from each other. That is, the particular VLAN configuration of FIG. 2 restricts the traffic flowing through the first communications path 88(1) from ports 80(0), 80(2), and 80(4). Similarly, the network switch 50 restricts the traffic flowing through the second communications path 88(2) from ports 80(0), 80(1), and 80(3). Accordingly, in the event that the data storage system 20 is set up so that a secure network connects to the management port (i.e., connector 82(3)), any use of the service port (i.e., connector 82(4)), such as by a service processor under control of a visiting technician, does not allow access to the secure network.

It should be further understood that the microcontroller 52 purposefully leaves port 80(0) of the network switch 52 unconnected to the other ports 80. Accordingly, in initial communications path topology, the crosslink pathway 68 (FIG. 1) remains unused and there is no return loop that is formed that could otherwise create an undesirable Ethernet loop if the hardware of the data storage system 20 is set up in a daisy chained, network rich configuration.

At some point, the microcontroller 52 of the management module 32 may become aware of a particular configuration, mode or condition of the data storage system 20. For example, following an initial power up of the entire data storage system 20 (i.e., shortly after the SP modules 28 complete their power-on self-tests (POSTs) and the operating system begins running), the operating system may notify the microcontroller 52 of the particular data storage system configuration. As another example, the other management module 32 (i.e., the peer management module 32) may inform the microcontroller 52 of the particular data storage system configuration in order to alleviate the need for software intervention if the microcontroller 52 has recently powered up after being hot-swapped replaced. Other techniques for informing the microcontroller 52 of the data storage system configuration are suitable for use as well (e.g., hardwired jumpers or switches, polling, periodic checking by the operating system or other type of software intervention, and so on). Further details will now be provided with reference to FIGS. 3 and 4.

Figure 3:
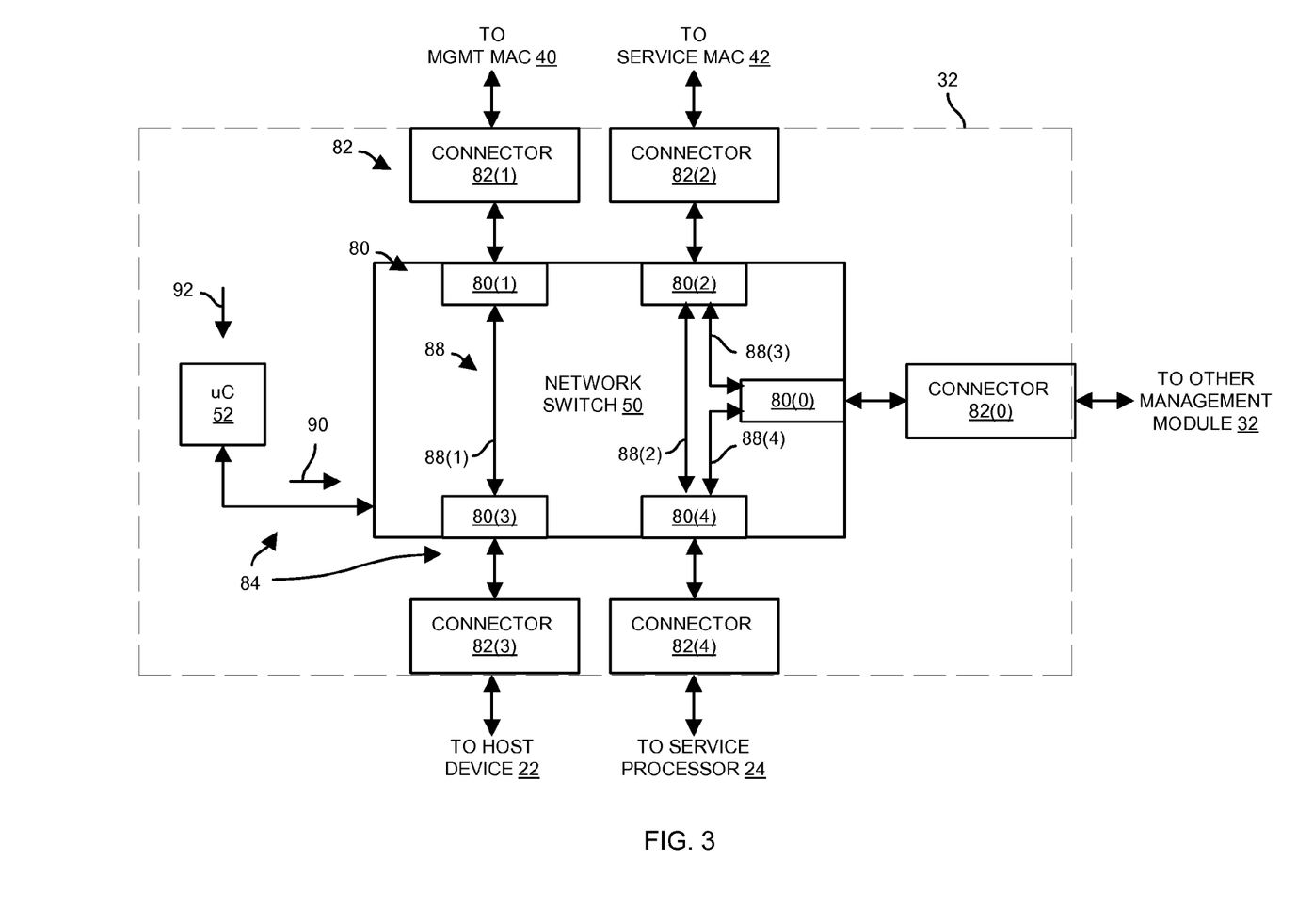
FIG. 3 is a block diagram of the modular communications management device of FIG. 2 when providing a new set of communications paths which defines a new communications path topology that is different than the initial communications path topology.

FIG. 3 shows the communications management device 32 of FIG. 2 with a new communications path topology which the communications management device 32 is capable of providing if the data storage system 20 has a particular configuration, e.g., a configuration which is not at risk to Ethernet loops and thus permitting use of port 80(0). After the microcontroller 52 has established the initial set of communications path 88 as shown in FIG. 2, the microcontroller 52 then receives a configuration command 92 which identifies the particular configuration to the microcontroller 52. As mentioned above, the source of this configuration command 52 may be the operating system if the data storage system 20 has recently been turned on. Another source of this configuration command 52 may be the other management module 32 (e.g., through the secondary conductive pathway 70 which may pass through the interconnect 30, also see FIG. 1) if the current management module 32 has just been hot-swapped in.

In response to the configuration command 92 which identifies the data storage system configuration as permitting use of port 80(0), the microcontroller 52 sends a new configuration signal 90 to the network switch 52 which directs the network switch 50 to connect port 80(0) to ports 80(2) and 80(4). As shown in FIG. 3, the network switch 50 establishes a new communications path 88(3) between ports 80(0) and 80(2). Additionally, the network switch 50 establishes a new communications path 88(4) between ports 80(0) and 80(4).

Figure 4:
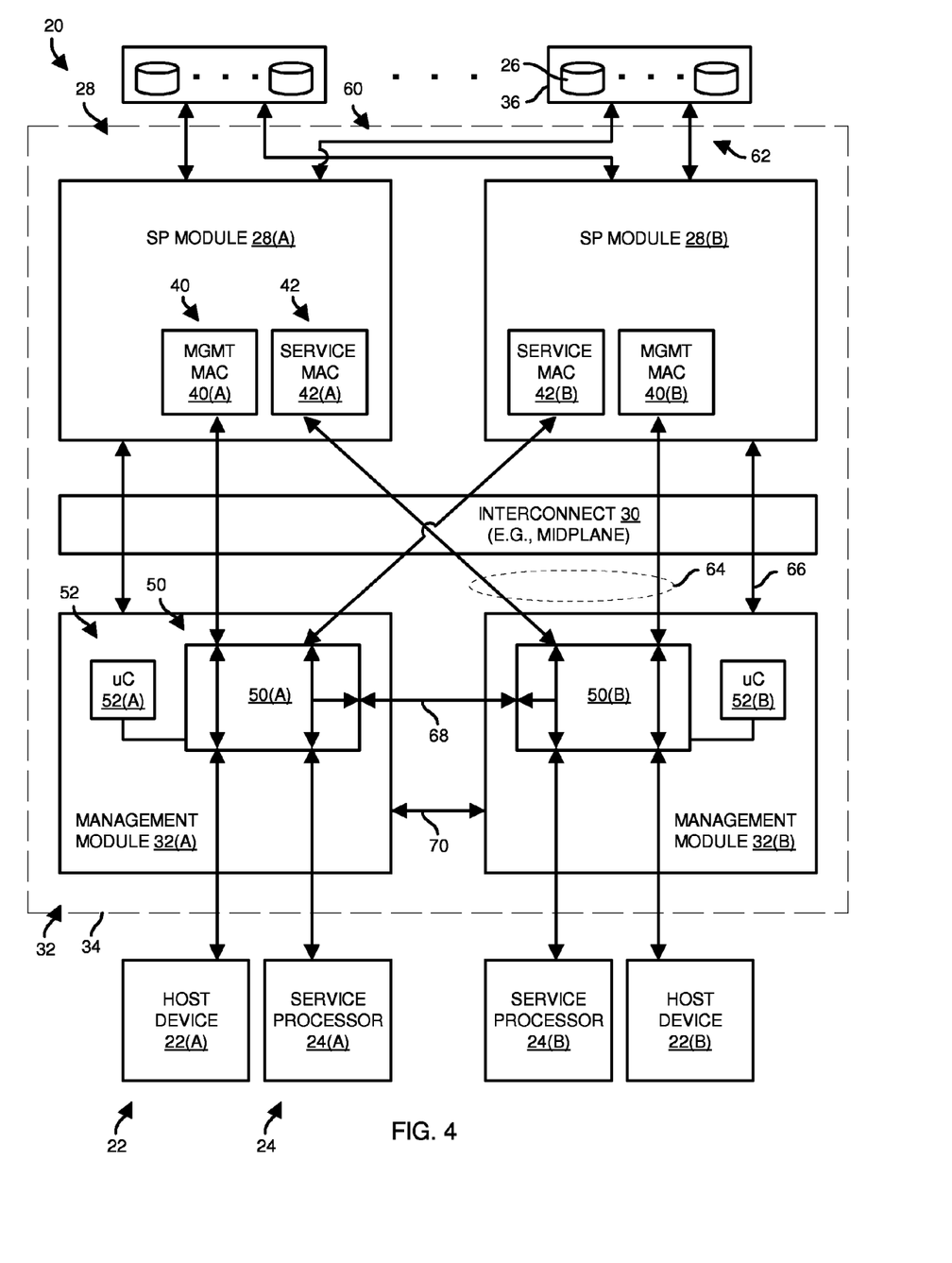
FIG. 4 is a block diagram of the data storage system of FIG. 1 showing the capability of enhanced service processor access through a crosslink.

FIG. 4 shows the data storage system 20 when both management modules 32 have been reconfigured with the new communications path topology of FIG. 3. Since each network switch 50 now provides traffic flow between ports 80(0) and 80(4) through communications path 88(4) (FIG. 3), each management module 28 is able to connect its service port (i.e., connector 82(4)) to the other management module 28 through the crosslink pathway 68 (FIG. 4). Additionally, since each network switch 50 now provides traffic flow between ports 80(0) and 80(2) through communications path 88(3), each management module 28 is able to connect the crosslink pathway 68 to a service MAC device 42. As a result, each management module 32 is now able to connect its service port to the service MAC devices 42 of both SP modules 28.

It should be understood that the layout of FIG. 4 is appropriate and advantageous for certain data storage system configurations. For example, the layout of FIG. 4 is well suited for a data storage system configuration in which it is desired that the designated external service port of each management module 32 be able to connect to the service MAC device 42 of both SP modules 28. Such enhanced connectivity provides great flexibility and data storage system access through each service port. Further details will now be provided with reference to FIGS. 5 and 6.

Figure 5:
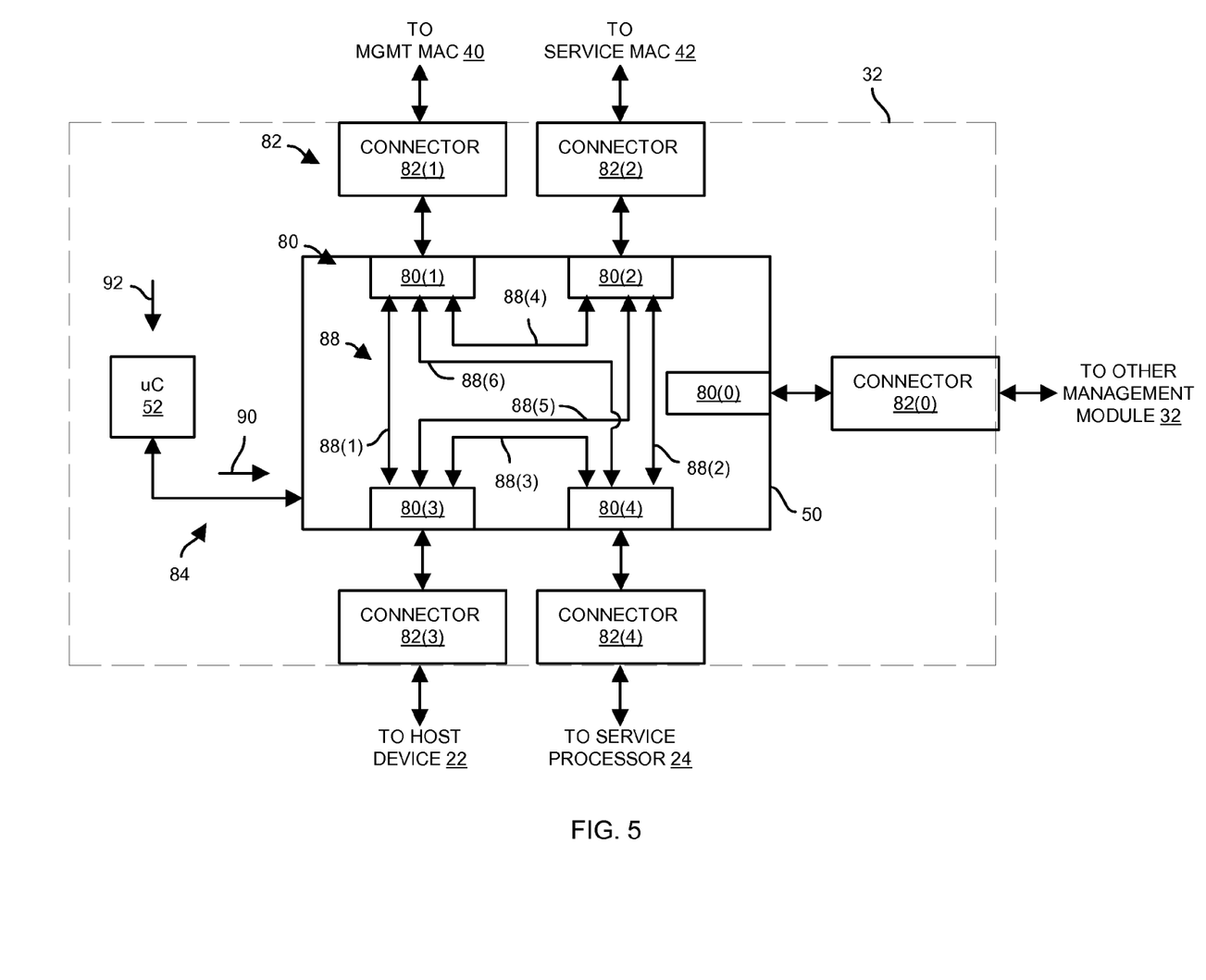
FIG. 5 is a block diagram of the modular communications management device of FIG. 2 when providing another set of communications paths which defines another communications path topology that is different than the initial communications path topology.

FIG. 5 shows the communications management device 32 with a new communications path topology which is different than that of the initial topology of FIG. 2, and which is also different than that of the enhanced topology of FIGS. 3 and 4. As shown in FIG. 5, the communications management device 32 is capable of fully connecting together ports 80(1), 80(2), 80(3) and 80(4). Such a topology is suitable when there is no need for logical isolation between the connectors 82(3) and 82(4). Rather, as shown in FIG. 6, the communications path topology of FIG. 5 is particularly well-suited for situations in which the data storage system 20 daisy-chains multiple enclosures 34 together for enhanced scalability.

Figure 6:
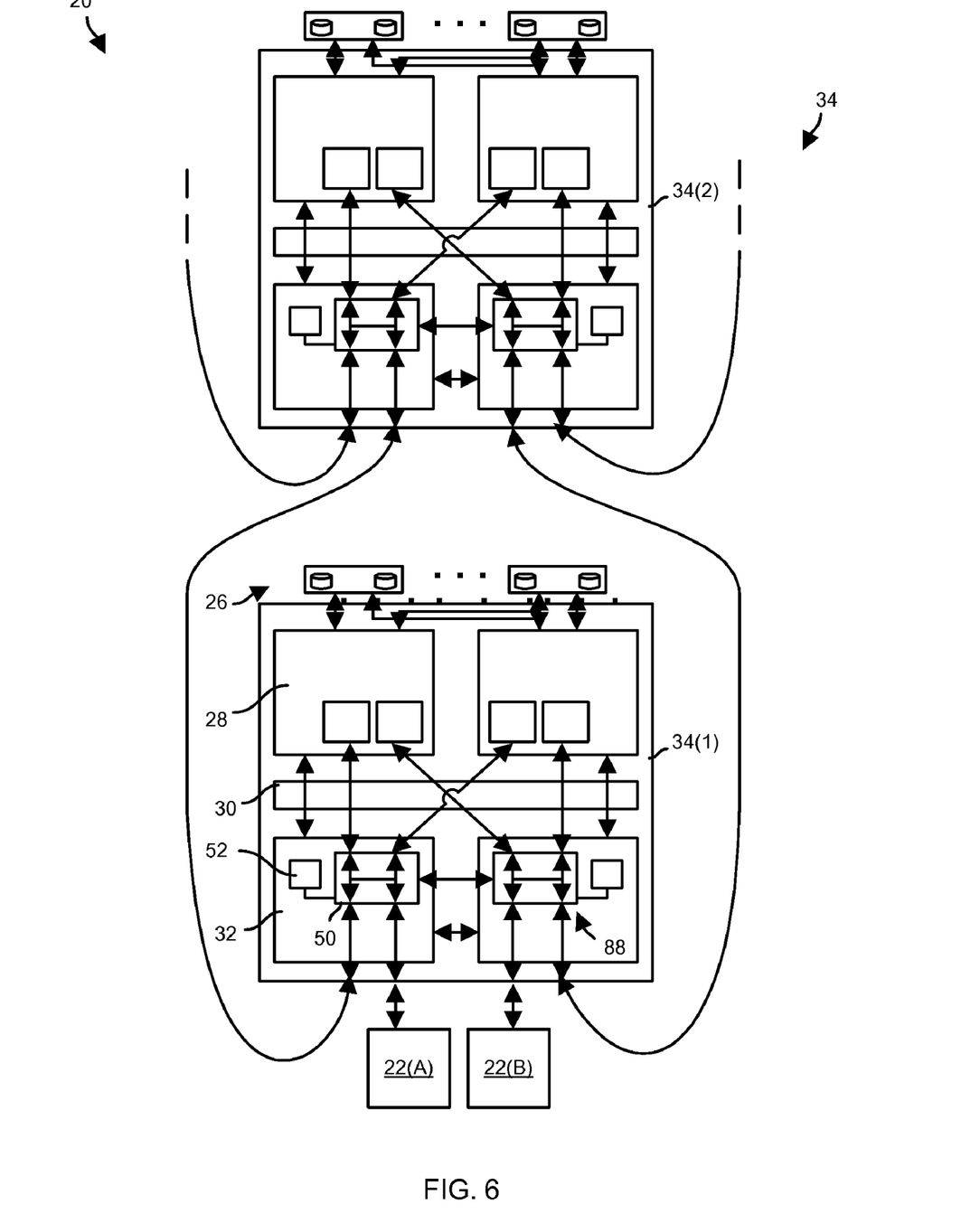
FIG. 6 is a block diagram of the data storage system of FIG. 1 showing the capability of enhanced scalability through daisy-chaining the modular communications management devices of multiple enclosures.

As shown in FIGS. 5 and 6, after the microcontroller 52 has established the initial set of communications paths 88 as shown in FIG. 2, the microcontroller 52 then receives a configuration command 92 which identifies the particular data storage system configuration to the microcontroller 52. As mentioned earlier, the source of this configuration command 92 may be the operating system if the data storage system 20 has recently been turned on. Another source of this configuration command 52 may be the other management module 32 (e.g., through the secondary conductive pathway 70 which may pass through the interconnect 30, also see FIG. 1) if the current management module 32 has just been hot-swapped in. In response to the configuration command 92, the microcontroller 52 outputs the configuration signal 90 which provides the new set of communications paths 88 of FIG. 5.

As shown in FIG. 5, the microcontroller 52 basically leaves port 80(0) of the network switch 50 unconnected. However, the microcontroller 52 leaves all other ports 80 wide open. That is, in addition to communications paths 88(1), 88(2), the network switch 50 now further includes a communications path 88(3) between ports 80(3) and 80(4), a communications path 88(4) between ports 80(1) and 80(2), a communications path 88(5) between ports 80(2) and 80(3), and a communications path 88(6) between ports 80(1) and 80(4).

FIG. 6 shows the data storage system 20 when both management modules 32 have been reconfigured with the new communications path topology of FIG. 5. Since each network switch 50 now provides traffic flow across the external connectors 82(3), 82(4) through ports 80(3), 80(4), multiple enclosures 34(1), 34(2), . . . (collectively, enclosures 34) are capable of being daisy-chained together for enhanced scalability. That is, new enclosures 34 are easily added to increase storage capacity. To reach an enclosure 34 further upstream, the traffic is able to simply pass through the intermediate enclosure 34 in the same manner as encountering a standard hop on a network.

It should be understood that the layout of FIG. 6 is appropriate and advantageous for certain data storage system configurations. For example, the layout of FIG. 6 is well suited for a data storage system which ties together multiple storage processor enclosures 34 in a network-style manner. In such an arrangement, the network switch 50 of each management module 32 is capable of operating as both an access way into the storage processing circuitry of a particular enclosure 34, but also as a network hop to other enclosures 34 which form the data storage system 20.

It should be further understood that the topology of FIG. 3 would not be suitable for use in the data storage system configuration of FIG. 6 since the topology of FIG. 3 would create undesirable Ethernet loops. Although the crosslink pathway 68 is still shown in FIG. 6, the crosslink pathway 68 is unconnected so that there is no traffic that passes through, i.e., port 80(0) on the network switches 50 of both management modules 32 has been deactivated.

Similarly, it should be understood that the topology of FIG. 5 would not be suitable for use in the data storage system configuration of FIG. 4. In particular, there is not logical isolation between the connectors 82(3) and 82(4).

At this point, it should be clear that the same management module hardware can be used in both the configuration of FIG. 4 as well as the configuration of FIG. 6. Even though the topology offered by the network switch 50 in FIG. 3 is problematic to the configuration of FIG. 6, and the topology offered by the network switch 50 in FIG. 5 is problematic to the configuration of FIG. 4, the dilemma is addressed by the network switch 50 initially offering an agnostic/benign topology as shown in FIG. 2. Such an agnostic/benign topology is suitable for either the configuration of FIG. 4 or the configuration of FIG. 6. Once the management module 32 is able to determine which configuration is in place, the microcontroller 52 of the management module 32 is able to reconfigure the network switch 50 to provide a new topology which is better suited to the particular configuration (e.g., see FIGS. 3 and 5). Further details will now be provided with reference to FIG. 7.

Figure 7:
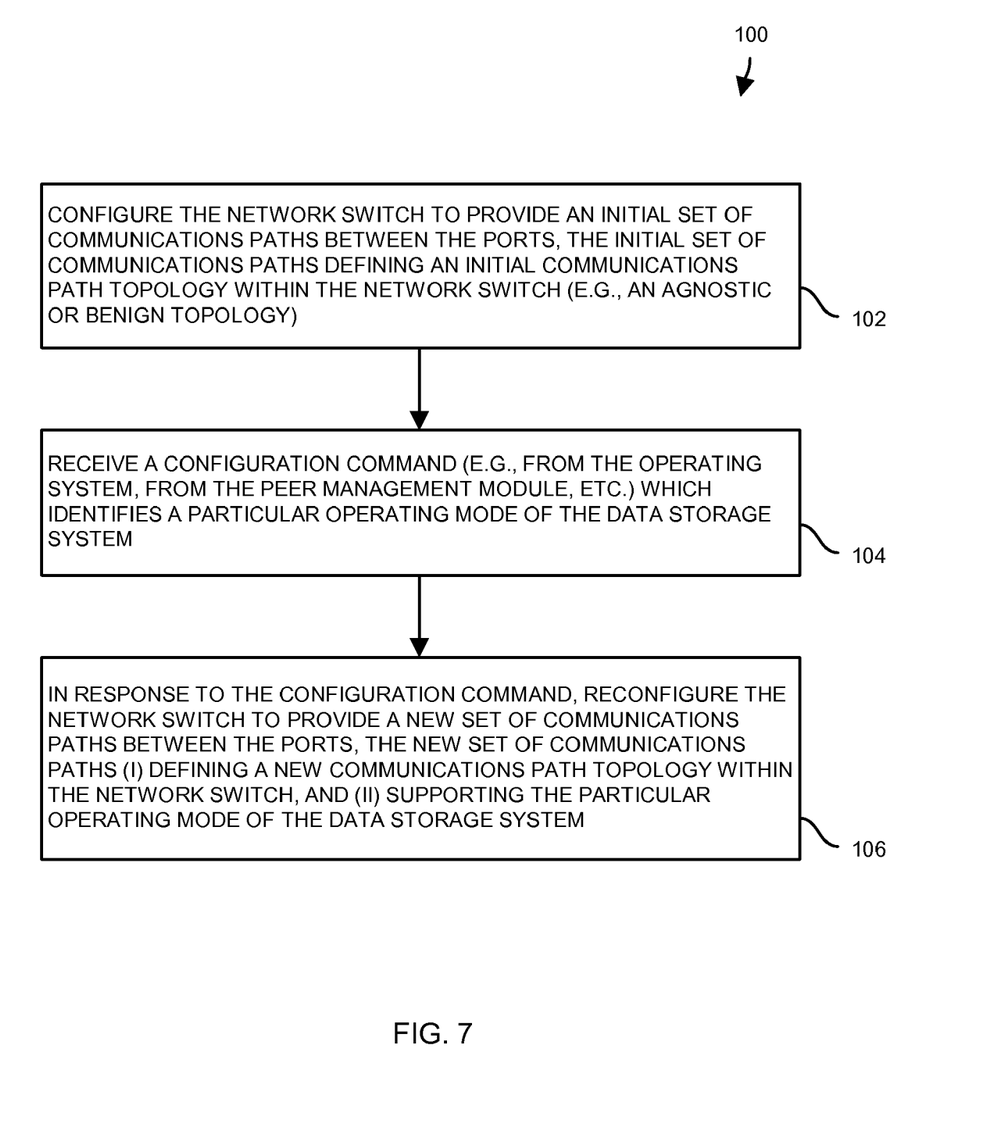
FIG. 7 is a flowchart of a procedure which is performed by a microcontroller of the modular communications management device of FIG. 2.

FIG. 7 is a flowchart of a procedure 100 which is performed by a microcontroller 52 of a management module 32. In step 102, the microcontroller 52 configures the network switch 50 of the management module 32 to provide an initial set of communications paths 88 between the ports 80 of the network switch 50. FIG. 2 shows an initial set of communications paths 88 defining an initial communications path topology within the network switch 50. As described above, such a topology is an agnostic/benign configuration of communications paths 80 which would not be detrimental in either a layout such as shown in FIG. 4 or a layout such as shown in FIG. 6.

In step 104, the microcontroller 52, after configuring the network switch 50 to provide the initial set of communications paths 88, receives a configuration command 92 which identifies a particular operating mode of the data storage system 20. In some arrangements, the configuration command 92 originates from the operating system (e.g., shortly after the operating system begins running). In other arrangements, the configuration command 92 originates from the other management module 32, i.e., each management module 32 remembers the data storage system configuration and informs the other management module 32 through the secondary conductive pathway 70 (e.g., an RS-232 path through the interconnect 30) in the event that the other management module 32 was recently added via a hot-swap installation.

In the context of the layout of FIG. 4, the configuration command 92 informs the microcontroller 52 that it can activate port 80(0) for use of the crosslink pathway 68 between the management modules 32 but that it must maintain logical isolation between the connectors 82(3), 82(4). In contrast, in the context of the layout of FIG. 6, the configuration command 92 informs the microcontroller 52 that it can interconnect all of the ports 80(1), 80(2), 80(3), 80(4), but must leave port 80(0) unconnected.

In step 106, the microcontroller 52 responds to the configuration command 92 by reconfiguring the network switch 50 to provide a new set of communications paths 88 between the ports 80 (also see FIGS. 3 and 5). The new set of communications paths 88 (i) defines a new communications path topology within the network switch 50, and (ii) supports the particular operating mode of the data storage system 20 (also see FIGS. 4 and 6).

As described above, an improved technique for managing communications within a data storage system 20 involves configuring a network switch 50 multiple times. In particular, the network switch 50 is configured to provide an initial set of communications paths 88 (FIG. 2). Such an initial set of communications paths 88 does not create an Ethernet loop or sacrifice logical isolation in the event that the data storage system 20 is sensitive to either scenario. Subsequently, the network switch 50 is reconfigured to provide a new set of communications paths 88 (e.g., FIG. 3 or 5) which improves operation of the data storage system 20, e.g., to provide a crosslink between network switches 50 for enhanced service processor access if the data storage system 20 does not enable daisy-chaining, to provide a daisy-chaining pathway for scalability if the data storage system 20 does not require logical isolation, etc.

While various embodiments of the invention have been particularly shown and described, it will be understood by those skilled in the art that various changes in form and details may be made therein without departing from the spirit and scope of the invention as defined by the appended claims.

What is claimed is:

1. Within a data storage system, a method for controlling a network switch having a set of ports, comprising:
    configuring the network switch to provide an initial set of communications paths between the ports, the initial set of communications paths defining an initial communications path topology within the network switch;
    after configuring the network switch to provide the initial set of communications paths within the network switch, receiving a configuration command which identifies a particular operating mode of the data storage system; and
    in response to the configuration command, reconfiguring the network switch to provide a new set of communications paths between the ports, the new set of communications paths (i) defining a new communications path topology within the network switch, the new communications path topology being different than the initial communications path topology, and (ii) supporting the particular operating mode of the data storage system;
    wherein the network switch is a multi-port Ethernet switching integrated circuit device;
    wherein configuring the network switch to provide the initial set of communications paths between the ports includes:
        sending an initial microcontroller signal from a microcontroller to the multi-port Ethernet switching integrated circuit device to direct the multi-port Ethernet switching integrated circuit device to provide the initial set of communications paths; and
    wherein receiving the configuration command which identifies the particular operating mode of the data storage system includes receiving the identification of the particular operating mode following an initial power up of the data storage system.

2. A method as in claim 1 wherein the multi-port Ethernet switching integrated circuit device includes (i) a first interconnect port and a second interconnect port, both of which are arranged to connect to an interconnect of the data storage system, and (ii) a first external port and a second external port, both of which are arranged to connect to external cables; and wherein sending the initial microcontroller signal from the microcontroller to the multi-port Ethernet switching integrated circuit device includes:
    establishing a first bidirectional communications path between the first interconnect port and the first external port, and
    establishing a second bidirectional communications path between the second interconnect port and the second external port, the first bidirectional communications path and the second bidirectional communications path being logically isolated from each other.

3. A method as in claim 2 wherein reconfiguring the network switch to provide the new set of communications paths between the ports includes:
    sending a new microcontroller signal from the microcontroller to the multi-port Ethernet switching integrated circuit device to direct the multi-port Ethernet switching integrated circuit device to provide the new set of communications paths in place of the initial set of communications paths.

4. A method as in claim 3 wherein sending the new microcontroller signal from the microcontroller to the multi-port Ethernet switching integrated circuit device to direct the multi-port Ethernet switching integrated circuit device to provide the new set of communications paths includes:
    providing an additional communications path between the ports of the multi-port Ethernet switching integrated circuit device.

5. A method as in claim 4 wherein the multi-port Ethernet switching integrated circuit device further includes a crosslink port which is arranged to connect to another multi-port Ethernet switching integrated circuit device; and wherein providing the additional communications path includes:
    establishing, as the additional communications path, a third bidirectional communications path between the first interconnect port and the crosslink port, the new set of communications paths thus including at least the first, second and third bidirectional communications paths.

6. A method as in claim 5 wherein establishing the third bidirectional communications path between the first interconnect port and the crosslink port includes:
maintaining logical isolation of the first external port and the second external port.

7. A method as in claim 4 wherein providing the additional communications path includes:
establishing, as the additional communications path, a third bidirectional communications path between the first external port and the second external port, the new set of communications paths thus including at least the first, second and third bidirectional communications paths.

8. A method as in claim 7 wherein the multi-port Ethernet switching integrated circuit device further includes a crosslink port which is arranged to connect to another multi-port Ethernet switching integrated circuit device; and wherein the method further comprises:
maintaining disconnection between the crosslink port and each of (i) the first interconnect port, (ii) the second interconnect port, (iii) the first external port, and (iv) the second external port.

9. A method as in claim 4 wherein the interconnect of the data storage system is arranged to provide access to a set of storage processors of the data storage system; and wherein receiving the configuration command which identifies the particular operating mode of the data storage system includes:
obtaining the configuration command from the set of storage processors through the interconnect.

10. A method as in claim 9 wherein obtaining the configuration command from the set of storage processors through the interconnect includes:
acquiring the configuration command in response to the set of storage processors reaching an initial power up condition.

11. A method as in claim 4 wherein receiving the configuration command which identifies the particular operating mode of the data storage system includes:
obtaining the configuration command from another multi-port Ethernet switching integrated circuit device of the data storage system.

12. A method as in claim 11 wherein obtaining the configuration command from the other multi-port Ethernet switching integrated circuit device includes:
acquiring the configuration command in response to the multi-port Ethernet switching integrated circuit device powering up from a hot-swap operation.

13. A method as in claim 11 wherein obtaining the configuration command from the other multi-port Ethernet switching integrated circuit device includes:
acquiring the configuration command through an RS-232 communications pathway between the multi-port Ethernet switching integrated circuit device and the other multi-port Ethernet switching integrated circuit device.

14. A communications management device, comprising:
a set of connectors;
a network switch coupled to the set of connectors, the network switch having a set of ports corresponding to the set of connectors; and
a controller coupled to the network switch, the controller being arranged to:
configure the network switch to provide an initial set of communications paths between the ports, the initial set of communications paths defining an initial communications path topology within the network switch,
after the network switch is configured to provide the initial set of communications paths within the network switch, receive a configuration command which identifies a particular operating mode of a data storage system, and
in response to the configuration command, reconfigure the network switch to provide a new set of communications paths between the ports, the new set of communications paths (i) defining a new communications path topology within the network switch, the new communications path topology being different than the initial communications path topology, and (ii) supporting the particular operating mode of the data storage system;
wherein receiving the configuration command which identifies the particular operating mode of the data storage system includes receiving the identification of the particular operating mode following an initial power up of the data storage system.

15. A communications management device as in claim 14 wherein the network switch is a multi-port Ethernet switching integrated circuit device; and wherein the controller, when configuring the network switch to provide the initial set of communications paths between the ports, is arranged to:
send an initial microcontroller signal to the multi-port Ethernet switching integrated circuit device to direct the multi-port Ethernet switching integrated circuit device to provide the initial set of communications paths.

16. A communications management device as in claim 15 wherein the multi-port Ethernet switching integrated circuit device includes (i) a first interconnect port and a second interconnect port, both of which are arranged to lead to an interconnect of the data storage system through corresponding connectors, and (ii) a first external port and a second external port, both of which are arranged to lead to external cables through corresponding connectors; and wherein the controller, when sending the initial microcontroller signal from the microcontroller to the multi-port Ethernet switching integrated circuit device, is arranged to:
establish a first bidirectional communications path between the first interconnect port and the first external port, and
establish a second bidirectional communications path between the second interconnect port and the second external port, the first bidirectional communications path and the second bidirectional communications path being logically isolated from each other.

17. A communications management device as in claim 16 wherein the controller, when reconfiguring the network switch to provide the new set of communications paths between the ports, is arranged to:
send a new microcontroller signal from the microcontroller to the multi-port Ethernet switching integrated circuit device to direct the multi-port Ethernet switching integrated circuit device to provide the new set of communications paths in place of the initial set of communications paths.

18. A communications management device as in claim 17 wherein the controller, when sending the new microcontroller signal from the microcontroller to the multi-port Ethernet switching integrated circuit device to direct the multi-port Ethernet switching integrated circuit device to provide the new set of communications paths, is arranged to:
provide an additional communications path between the ports of the multi-port Ethernet switching integrated circuit device.

19. A data storage system, comprising:
a data storage interconnect;
a set of storage processors coupled to the data storage interconnect; and
a set of communications management devices coupled to the data storage interconnect, each communications management device being arranged to communicate with the set of storage processors through the data storage interconnect, and each communications management device including a set of ports, a network switch coupled to the set of ports, and a controller coupled to the switch, the controller of that communications management device being arranged to:
configure the network switch to provide an initial set of communications paths between the ports, the initial set of communications paths defining an initial communications path topology within the network switch,
after the network switch is configured to provide the initial set of communications paths within the network switch, receive a configuration command which identifies a particular operating mode of the data storage system, and
in response to the configuration command, reconfigure the network switch to provide a new set of communications paths between the ports, the new set of communications paths (i) defining a new communications path topology within the network switch, the new communications path topology being different than the initial communications path topology, and (ii) supporting the particular operating mode of the data storage system;
wherein receiving the configuration command which identifies the particular operating mode of the data storage system includes receiving the identification of the particular operating mode following an initial power up of the data storage system.

20. Within a data storage system, a method for controlling a network switch having a set of ports, comprising:
configuring the network switch to provide an initial set of communications paths between the ports, the initial set of communications paths defining an initial communications path topology within the network switch;
after configuring the network switch to provide the initial set of communications paths within the network switch, receiving a configuration command which identifies a particular operating mode of the data storage system; and
in response to the configuration command, reconfiguring the network switch to provide a new set of communications paths between the ports, the new set of communications paths (i) defining a new communications path topology within the network switch, the new communications path topology being different than the initial communications path topology, and (ii) supporting the particular operating mode of the data storage system;
wherein receiving the configuration command which identifies the particular operating mode of the data storage system includes receiving the identification of the particular operating mode following a hot-swap replacement of the microcontroller.

21. A communications management device, comprising:
a set of connectors;
a network switch coupled to the set of connectors, the network switch having a set of ports corresponding to the set of connectors; and
a controller coupled to the network switch, the controller being arranged to:
configure the network switch to provide an initial set of communications paths between the ports, the initial set of communications paths defining an initial communications path topology within the network switch,
after the network switch is configured to provide the initial set of communications paths within the network switch, receive a configuration command which identifies a particular operating mode of a data storage system, and
in response to the configuration command, reconfigure the network switch to provide a new set of communications paths between the ports, the new set of communications paths (i) defining a new communications path topology within the network switch, the new communications path topology being different than the initial communications path topology, and (ii) supporting the particular operating mode of the data storage system;
wherein receiving the configuration command which identifies the particular operating mode of the data storage system includes receiving the identification of the particular operating mode following a hot-swap replacement of the controller.

* * * * *